(12) United States Patent
Cheng et al.

(10) Patent No.: US 7,957,634 B2
(45) Date of Patent: Jun. 7, 2011

(54) CIRCUIT FOR CALIBRATING FOCUS POSITION OF OPTICAL MODULE AND CALIBRATING METHOD THEREOF

(75) Inventors: Ting-Yuan Cheng, Taipei County (TW); Pai-Yu Tien, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 59 days.

(21) Appl. No.: 12/423,813

(22) Filed: Apr. 15, 2009

(65) Prior Publication Data
US 2010/0209092 A1 Aug. 19, 2010

(30) Foreign Application Priority Data

Feb. 13, 2009 (TW) ............................... 98104585 A

(51) Int. Cl.
*G03B 13/36* (2006.01)
(52) U.S. Cl. ...... 396/125; 396/104; 348/349; 250/201.2
(58) Field of Classification Search ............ 396/89, 396/95, 125; 348/345, 351, 349; 250/201.2–201.3, 250/201.7
See application file for complete search history.

(56) References Cited

U.S. PATENT DOCUMENTS

| | | | | |
|---|---|---|---|---|
| 4,967,279 A | * | 10/1990 | Murashima | 348/356 |
| 5,477,271 A | * | 12/1995 | Park | 348/356 |
| 5,576,764 A | * | 11/1996 | Noh et al. | 348/356 |
| 2007/0140677 A1 | * | 6/2007 | Hsieh et al. | 396/127 |
| 2008/0080848 A1 | * | 4/2008 | Tsai | 396/127 |

* cited by examiner

*Primary Examiner* — Clayton E Laballe
*Assistant Examiner* — Leon W Rhodes
(74) *Attorney, Agent, or Firm* — Winston Hsu; Scott Margo

(57) ABSTRACT

A circuit for calibrating a focus position of an optical module includes a calibration signal generating unit and a focus position adjusting unit. The calibration signal generating unit is utilized for generating a calibration signal according to a first focus signal and a second focus signal at the same time, where the first focus signal and second focus signal correspond to a first focus position and a second focus position, respectively, and the first focus position is different from the second focus position. The focus position adjusting unit is coupled to the calibration signal generating unit and is utilized for adjusting the focus position of the optical module to a specific focus position according to the calibration signal.

16 Claims, 5 Drawing Sheets (a)

(b)

CIRCUIT FOR CALIBRATING FOCUS POSITION OF OPTICAL MODULE AND CALIBRATING METHOD THEREOF

BACKGROUND OF THE INVENTION

1. Field of the Invention

The present invention relates to calibrating a focus position of an optical module, and more particularly, to a circuit utilized a phase locked loop (DLL) for calibrating a focus position of an optical module and a calibrating method thereof.

2. Description of the Prior Art

A general camera module detects focus values (FV) corresponding to focus positions for deriving a mapping table of the focus positions and the focus values or a characteristic curve of the focus positions and the focus values when performing an auto focus operation (i.e. auto calibrating the focus position). Please refer to FIG. 1. FIG. 1 is a diagram illustrating a characteristic curve of the focus positions and the focus values and an optimal focus position derived using a mountain-climbing search method. As shown in FIG. 1, a solid line 110 represents the characteristic curve of the focus positions and the focus values, wherein the focus position corresponding to a biggest focus value is the optimal focus position (i.e. the peak position of the characteristic curve 110), and a dotted line is used to represent the moving direction and the moving step size of the focus position for searching the optimal focus position according to the mountain-climbing search method. When the camera module performs the focus operation, the mountain-climbing search method is a conventional method utilized by the camera module. As the operation of the mountain-climbing search method is well known to those skilled in the art, a detailed description is omitted here for the sake of brevity.

However, the characteristic curve 110 of the focus positions and the focus values should be derived before the mountain-climbing search method can be utilized to search for the optimal focus position. Ideally, the characteristic curve 110 is a symmetrical curve as shown in FIG. 1, and the characteristic curve 110 has only one peak position. However, due to noise interference, an actual characteristic curve sensed by the camera module is an asymmetrical curve as shown in FIG. 2a, where the characteristic curve shown in FIG. 2b has two or even more than two peak positions. Thus, the optimal focus position searched by the mountain-climbing search method may not be an actual optimal focus position. Therefore, since the camera module fails to take a photograph with the optimal focus position, the quality of the photographs or the images is significantly degraded.

SUMMARY OF THE INVENTION

Therefore, an objective of the present invention is to provide a circuit utilizing a phase locked loop (DLL) for calibrating a focus position of an optical module and a related calibrating method, to solve the above-mentioned problems.

According to an embodiment of the present invention, a circuit for calibrating a focus position of an optical module is disclosed. The circuit comprises a calibration signal generating unit and a focus position adjusting unit. The calibration signal generating unit is utilized for generating a calibration signal according to a first focus signal and a second focus signal at the same time, where the first focus signal and the second focus signal correspond to a first focus position and a second focus position, respectively, and the first focus position is different from the second focus position. The focus position adjusting unit is coupled to the calibration signal generating unit and is utilized for adjusting the focus position of the optical module to a specific focus position according to the calibration signal.

According to another embodiment of the present invention, a method for calibrating a focus position of an optical module is disclosed. The method comprises: generating a calibration signal according to a first focus signal and a second focus signal at the same time, where the first focus signal and the second focus signal correspond to a first focus position and a second focus position, respectively, and the first focus position is different from the second focus position; and adjusting the focus position of the optical module to a specific focus position according to the calibration signal.

According to the exemplary circuit and method for calibrating a focus position of an optical module of the present invention, the circuit and method of the present invention can remove noise disturbance to derive a correct optimal focus position to thereby improve the quality of photographs or images, even when a detected characteristic curve of focus positions and focus values is affected by noise, as shown in FIG. 2.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
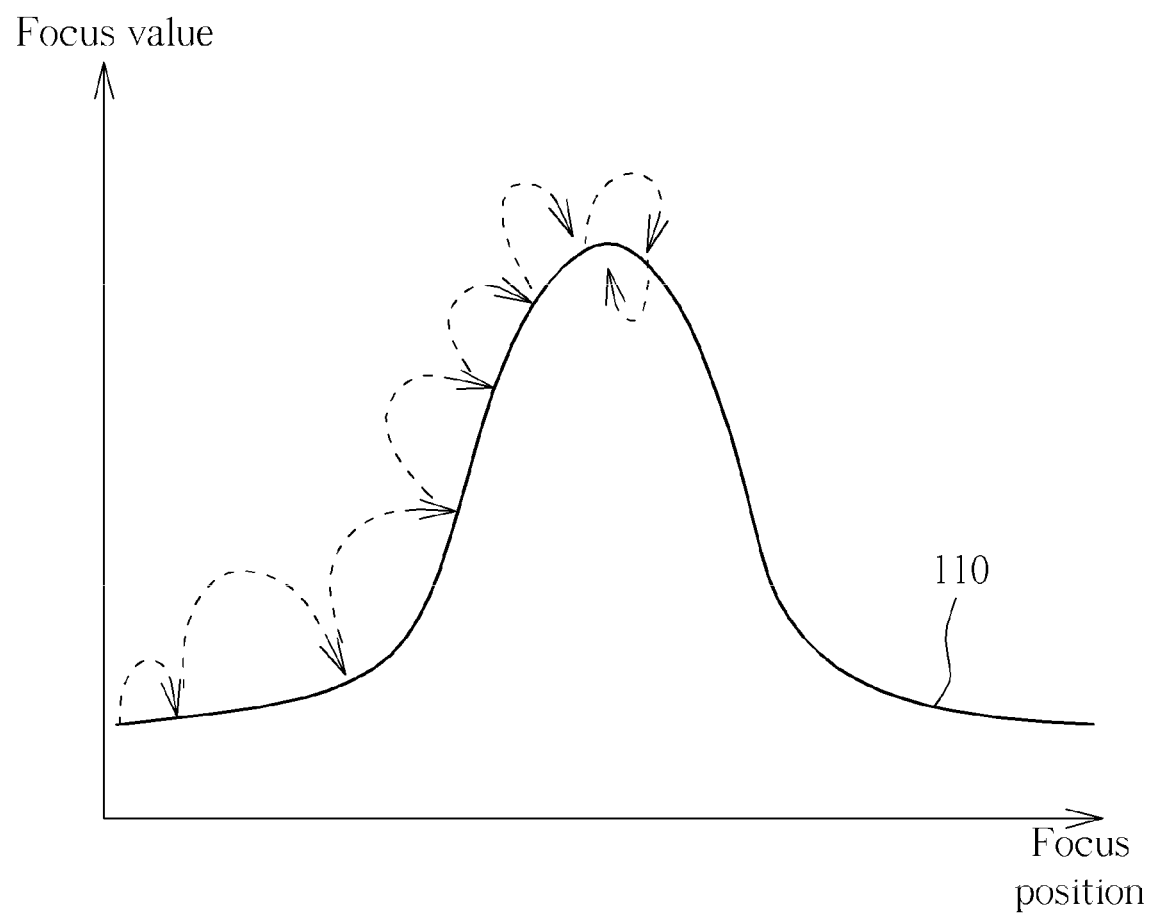
FIG. 1 is a diagram illustrating a characteristic curve of focus positions and focus values and an optimal focus position derived using a mountain-climbing search method.
Figure 2:
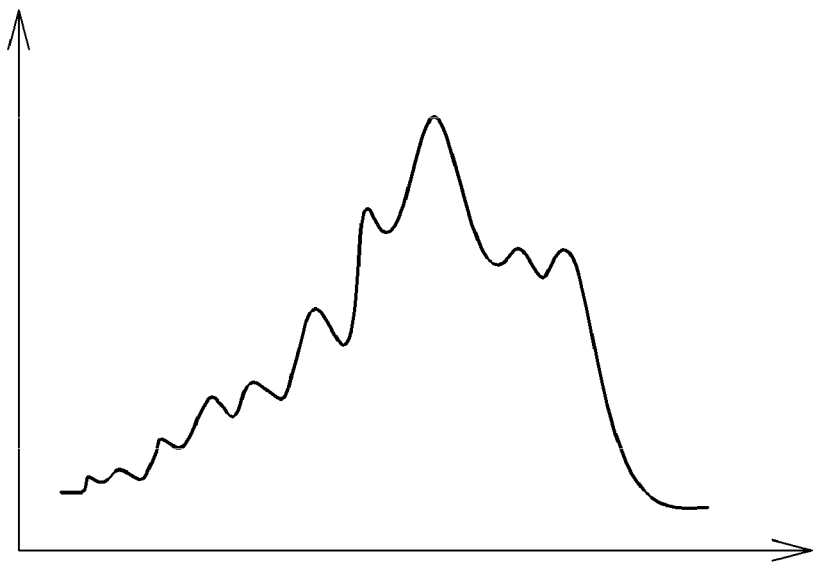
FIG. 2 is a diagram illustrating a characteristic curve of the focus positions and the focus values affected by noise.
Figure 2:
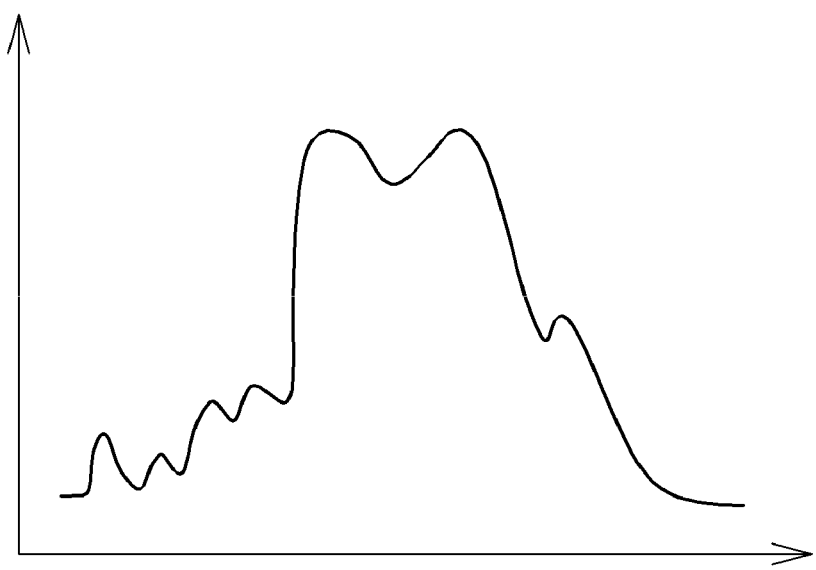
Figure 3:
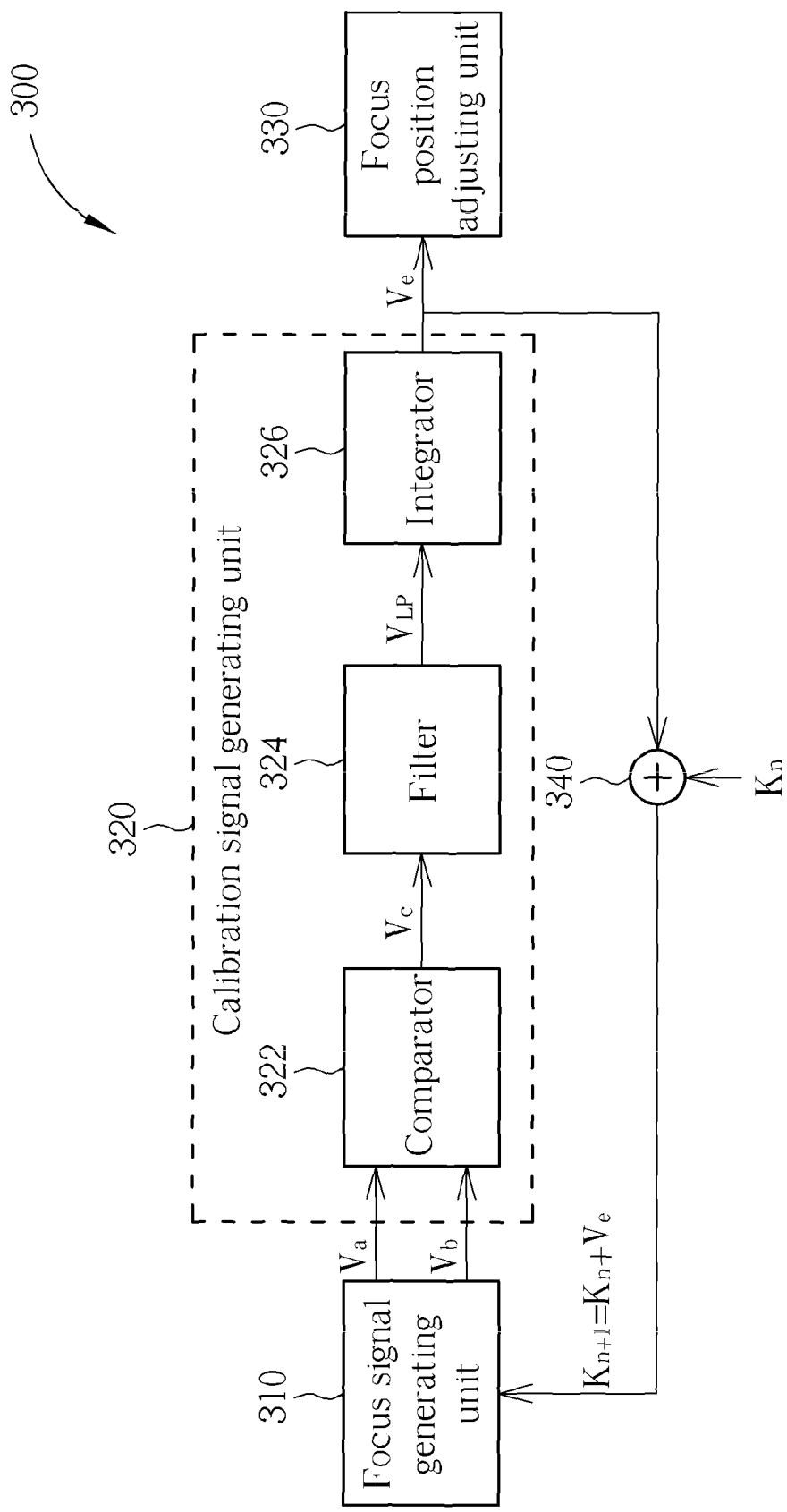
FIG. 3 is a diagram illustrating a circuit for calibrating a focus position of an optical module according to an embodiment of the present invention.

Please refer to FIG. 3. FIG. 3 is a diagram illustrating a circuit 300 for calibrating a focus position of an optical module according to an embodiment of the present invention. As shown in FIG. 3, the circuit 300 includes a focus signal generating unit 310, a calibration signal generating unit 320, a focus position adjusting unit 330 and an adder 340, wherein the calibration signal generating unit 320 includes a comparator 322, a filter 324 and an integrator 326. Furthermore, the optical module employing the circuit 300 of the present invention can be a camera module utilized for taking photographs or other optical modules needed to calibrate the focus position.

Figure 4:
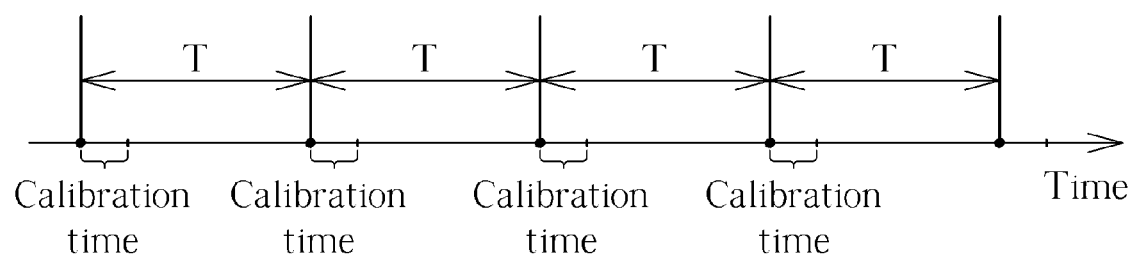
FIG. 4 is a timing diagram illustrating the circuit shown in FIG. 3 calibrating the focus position of the optical module.
Figure 5:
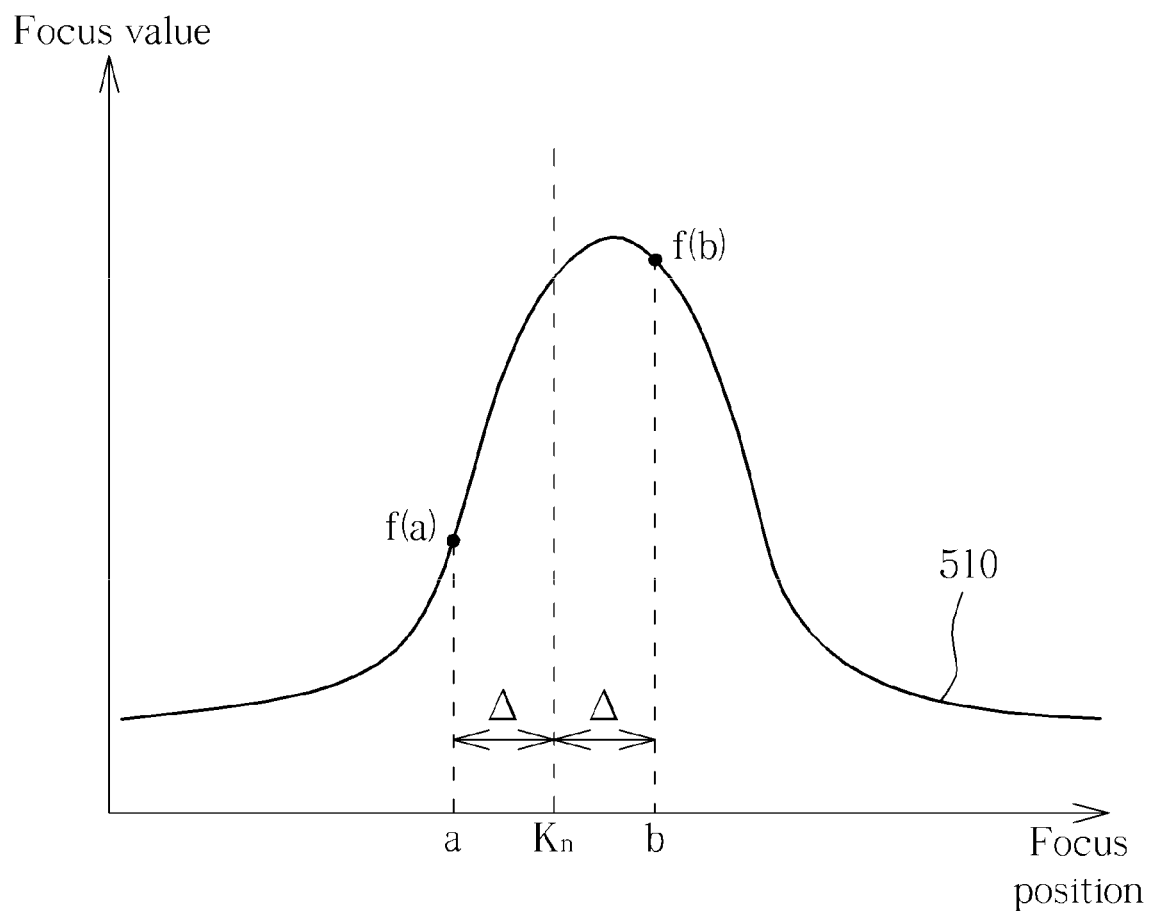
FIG. 5 is a diagram illustrating a characteristic curve of the focus positions and the focus values sensed by the optical module at each calibration time shown in FIG. 4.

Regarding the operation principle of the circuit 300, please refer to FIGS. 3 through 5. FIG. 4 is a timing diagram illustrating the circuit 300 calibrating the focus position of the optical module, and FIG. 5 is a diagram illustrating a characteristic curve 510 of the focus positions and the focus values sensed by the optical module at each calibration timing shown in FIG. 4. Please note that, although FIG. 5 is a characteristic curve diagram, the characteristic curve diagram can also be a mapping table of the focus positions and the focus values. The optical module utilizes the above-mentioned mountain-climbing search method or other conventional calibration methods to search a predetermined focus position $K_0$ before utilizing the circuit 300 of the present invention to calibrate the focus position of the optical module. Of course, the characteristic curve of the focus positions and the focus values may be affected by noise interference and is therefore not a symmetrical curve. Thus, the predetermined focus position $K_0$ may not be an optimal focus position, and the predetermined focus position $K_0$ can be regarded as a coarse tuning result. Additionally, the predetermined focus position $K_0$ can also be an average value of a plurality of coarse tuning results derived from the mountain-climbing search method or other conventional calibration methods: for example, finding ten coarse tuning results by the mountain-climbing search method and then averaging the ten coarse tuning results to derive an average value to serve as the predetermined focus position $K_0$.

Please note that "the focus value" of the present invention can be a luminance value, image edge intensity value or other related values.

The focus signal generating unit 310 determines a first focus position a and a second focus position b according to the predetermined focus position $K_0$ in a first calibration time shown in FIG. 4 after determining the predetermined focus position $K_0$, wherein the space $\Delta$ between the first focus position a and the predetermined focus position $K_0$ is equal to the space $\Delta$ between the second focus position b and the predetermined focus position $K_0$, and the space $\Delta$ can be set according to the designer's consideration. For example, the space $\Delta$ can be set as a quarter of a maximum adjustable focus length. The focus signal generating unit 310 derives a first focus value f(a) corresponding to the first focus position a and a second focus value f(b) corresponding to the second focus position b according to the characteristic curve 510 shown in FIG. 5 or a mapping table of the focus positions and the focus values after determining the first focus position a and the second focus position b, and then generates a first focus signal $V_a$ and a second focus signal $V_b$ according to the first focus value f(a) and the second focus value f(b), respectively.

Next, the comparator 322 compares the first focus signal $V_a$ and the second focus signal $V_b$ to generate a comparing signal $V_c$, the filter 324 filters the comparing signal $V_c$ to generate a filtered comparing signal $V_{LP}$, and the integrator 326 generates a calibration signal $V_e$ according to the filtered comparing signal $V_{LP}$, wherein the calibration signal $V_e$ can be regarded as an adjusting value of a focus position. Finally, the focus position adjusting unit 330 adjusts the focus position of the optical module from the current focus position (i.e., the predetermined focus position $K_0$) to a specific focus position according to the calibration signal $V_e$. Please note that the calibration signal $V_e$ can reflect a difference between the first focus signal $V_a$ and the second focus signal $V_b$ (i.e., a difference between the first focus value f(a) and the second focus value f(b)), and the focus position adjusting unit 330 shifts the focus position of the optical module from the predetermined focus position $K_0$ to the focus position corresponding to the peak position of the characteristic curve 510. Taking FIG. 5 for example, ideally, the characteristic curve 510 is a symmetrical curve and merely has a single peak value; if the predetermined focus position $K_0$ is an optimal focus position, the optimal focus position corresponds to the peak value of the characteristic curve 510 and the first focus value f(a) and the second focus value f(b) should be the same value. However, as shown in FIG. 5, the first focus value f(a) is smaller than the second focus value f(b), and the optimal focus position can be detected at the right side of the predetermined focus position $K_0$. Thus, the focus position adjusting unit 330 shifts the focus position of the optical module toward the right from the predetermined focus position $K_0$ to a specific focus position according to the calibration signal $V_e$, where the specific focus position can be regarded as an optimal focus position in this calibration.

As shown in FIG. 5, the first focus value f(a) is smaller than the second focus value f(b), and therefore the focus position adjusting unit 330 shifts the focus position of the optical module toward the right from the predetermined focus position $K_0$ to the specific focus position; however, if the first focus value f(a) is bigger than the second focus value f(b), the focus position adjusting unit 330 shifts the focus position of the optical module toward the left from the predetermined focus position $K_0$ to another specific focus position. Similarly, if the first focus value f(a) is equal to the second focus value f(b), that is, the predetermined focus position $K_0$ is the optimal focus position in this calibration, the focus position of the optical module needs no calibration and is not shifted from the current position.

Furthermore, the focus position adjusting unit 330 adjusts the focus position of the optical module from the predetermined focus position $K_0$ to the specific focus position in a calibration period T shown in FIG. 4. In another embodiment of the present invention, the focus position adjusting unit 330 adjusts the focus position of the optical module step by step from the predetermined focus position $K_0$ to the specific focus position at a plurality of time points of the calibration period T, wherein any two adjacent time points of the plurality of time points of the calibration period T have the same interval, and the focus position adjusting unit 330 adjusts the focus position of the optical module with the same adjusting value at each time point of the plurality of time points. For example, if the adjusting value corresponding to the calibration signal $V_e$ is 0.3 and the calibration period T is divided into ten time points, the adjusting value of the focus position at each time point is equal to 0.03 (i.e., $0.3/10$).

The adder 340 sums up the calibration signal $V_e$ and the predetermined focus position $K_0$ to generate a predetermined focus position $K_1$ for a next calibration time before the next calibration time (i.e., the second calibration time shown in FIG. 4). Then, the optical module will perform detection to generate a characteristic curve or a mapping table of the focus positions and the focus values before the second calibration time shown in FIG. 4. The focus signal generating unit 310 determines the first focus signal $V_a$ and the second focus signal $V_b$ according to the predetermined focus position $K_1$, as described in the above paragraphs directed to the operation in the first calibration time. The comparator 322 compares the first focus signal $V_a$ and the second focus signal $V_b$ to generate a comparing signal $V_c$, the filter 324 filters the comparing signal $V_c$ to generate a filtered comparing signal $V_{LP}$, and the integrator 326 generates a calibration signal $V_e$ according to the filtered comparing signal $V_{LP}$. Finally, the focus position adjusting unit 330 adjusts the focus position of the optical module from the current focus position (i.e., the predetermined focus position $K_1$) to a specific focus position according to the calibration signal $V_e$. In simple terms, a predetermined focus position ($K_{n+1}$) utilized by the focus position adjusting unit in a current calibration time is a previous specific focus position (i.e., $K_{n+1}=K_n+V_e$) of the optical module which is adjusted in a previous calibration time.

In each following calibration time, the circuit 300 repeats the above-mentioned steps to adjust the focus position of the optical module to a corresponding specific focus position, wherein the specific focus position of the optical module adjusted in each calibration time can be regarded as the optimal focus positions in the corresponding calibration time.

Additionally, the characteristic curve or the mapping table of the focus positions and the focus values detected in each calibration time may be affected by the noise and become asymmetrical, and the focus signal $V_a$ and $V_b$ generated by the focus signal generating unit 310 may also be affected by the noise and therefore cannot reflect the correct values. However, because the filter 324 receives a plurality of comparing signals $V_c$ in a plurality of calibration times, respectively, the noise interference can be filtered out. This allows the filtered comparing signal $V_{LP}$ generated by the filter 324 to be free of the noise effects, and enables the calibration signal $V_e$ generated by the integrator 326 to reflect a desired calibration value more correctly, thereby making the focus position of the optical module adjust to the optimal focus position.

In summary, the present invention utilizes a characteristic curve (or a mapping table) of the focus positions and the focus values, which ideally is a symmetrical curve and has a single peak value; compares the corresponding focus signals of two focus positions, and determines the adjusting value of the focus position according to the comparing result. Furthermore, the present invention particularly utilizes a DLL circuit for comparing the corresponding focus signals of two focus positions and generating a calibration signal to adjust the focus position of the optical module. Thus, the focus position of the optical module can be adjusted to the optimal focus position due to the fact that the noise effects are removed.

Those skilled in the art will readily observe that numerous modifications and alterations of the device and method may be made while retaining the teachings of the invention.

What is claimed is:

1. A circuit for calibrating a focus position of an optical module, comprising:
   a calibration signal generating unit, for generating a calibration signal according to at least a first focus signal and a second focus signal at the same time, where the first and second focus signal correspond to a first and a second focus positions, respectively, and the first focus position is different from the second focus position; and
   a focus position adjusting unit, coupled to the calibration signal generating unit, for adjusting the focus position of the optical module to a specific focus position according to the calibration signal;
   wherein the calibration signal generating unit comprises:
   a comparator, for comparing the first focus signal and the second focus signal to generate a comparing signal;
   a filter, coupled to the comparator, for filtering the comparing signal to generate a filtered comparing signal; and
   an integrator, coupled to the filter, for generating the calibration signal according to the filtered comparing signal.

2. The circuit of claim 1, further comprising:
   a focus signal generating unit, coupled to the calibration signal generating unit, for determining the first focus position and the second focus position according to a predetermined focus position, and generating the first focus signal corresponding to the first focus position and the second focus signal corresponding to the second focus position.

3. The circuit of claim 2, wherein a space between the first focus position and the predetermined focus position is equal to a space between the second focus position and the predetermined focus position.

4. The circuit of claim 2, wherein the focus signal generating unit derives a first focus value corresponding to the first focus position and a second focus value corresponding to the second focus position according to a mapping table of focus positions and focus values, and generates the first focus signal and the second focus signal according to the first focus value and the second focus value, respectively.

5. The circuit of claim 2, wherein in each calibration time of a plurality of calibration times, the focus position adjusting unit adjusts the focus position of the optical module to a corresponding specific focus position according to an output of the integrator, and a predetermined focus position utilized by the focus position adjusting unit in a current calibration time is a previous specific focus position of the optical module which is adjusted in a previous calibration time.

6. The circuit of claim 1, wherein in each calibration time of a plurality of calibration times, the focus position adjusting unit adjusts the focus position of the optical module to a corresponding specific focus position according to an output of the calibration signal generating unit, an interval between two calibration times is a calibration period, and the focus position adjusting unit adjusts the focus position of the optical module to the corresponding specific focus position in the calibration period.

7. The circuit of claim 6, wherein the focus position adjusting unit adjusts the focus position of the optical module step by step from the predetermined focus position to the corresponding specific focus position at a plurality of time points in the calibration period.

8. The circuit of claim 7, wherein any two adjacent time points of the plurality of time points in the calibration period have a same interval, and the focus position adjusting unit adjusts the focus position of the optical module with a same adjusting value at each time point of the plurality of time points.

9. A method for calibrating a focus position of an optical module, comprising:
   generating a calibration signal according to at least a first focus signal and a second focus signal at the same time, where the first focus signal and the second focus signal correspond to a first focus position and a second focus position, respectively, and the first focus position is different from the second focus position; and
   adjusting the focus position of the optical module to a specific focus position according to the calibration signal;
   wherein the step of generating the calibration signal according to at least the first focus signal and the second focus signal at the same time comprises:
   comparing the first focus signal and the second focus signal to generate a comparing signal;
   filtering the comparing signal to generate a filtered comparing signal; and
   generating the calibration signal according to the filtered comparing signal.

10. The method of claim 9, further comprising:
    determining the first focus position and the second focus position according to a predetermined focus position; and
    generating the first focus signal corresponding to the first focus position and the second focus signal corresponding to the second focus position.

11. The method of claim 10, wherein a space between the first focus position and the predetermined focus position is equal to a space between the second focus position and the predetermined focus position.

12. The method of claim 10, wherein the step of generating the first focus signal corresponding to the first focus position and the second focus signal corresponding to the second focus position comprises:
    deriving a first focus value corresponding to the first focus position and a second focus value corresponding to the second focus position according to a mapping table of focus positions and focus values; and generating the first focus signal and the second focus signal according to the first focus value and the second focus value, respectively.

13. The method of claim 10, further comprising:

adjusting the focus position of the optical module to a corresponding specific focus position according to the generated calibration signal in each calibration time of a plurality of calibration times;

wherein a predetermined focus position utilized in a current calibration time is a previous specific focus position of the optical module which is adjusted in a previous calibration time.

14. The method of claim 9, further comprising:

adjusting the focus position of the optical module to a corresponding specific focus position according to the generated calibration signal in each calibration time of a plurality of calibration times, wherein an interval between two calibration times is a calibration period; and adjusting the focus position of the optical module to the corresponding specific focus position in the calibration period.

15. The method of claim 14, wherein the step of adjusting the focus position of the optical module to the corresponding specific focus position in the calibration period comprises:

adjusting the focus position of the optical module step by step from the predetermined focus position to the corresponding specific focus position at a plurality of time points in the calibration period.

16. The method of claim 15, wherein any two adjacent time points of the plurality of time points in the calibration period have a same interval, and the step of adjusting the focus position of the optical module step by step from the predetermined focus position to the corresponding specific focus position at the plurality of time points in the calibration period comprises:

adjusting the focus position of the optical module with a same adjusting value at each time point of the plurality of time points.

* * * * *